(12) United States Patent
Liu et al.

(10) Patent No.: US 11,697,133 B2
(45) Date of Patent: Jul. 11, 2023

(54) LINEAR MOTOR

(71) Applicant: AAC Microtech (Changzhou) Co., Ltd., Changzhou (CN)

(72) Inventors: Kejia Liu, Shenzhen (CN); Jie Ma, Shenzhen (CN); Lubin Mao, Shenzhen (CN); Zhiyong Cui, Shenzhen (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 59 days.

(21) Appl. No.: 17/549,832

(22) Filed: Dec. 13, 2021

(65) Prior Publication Data

US 2022/0203401 A1 Jun. 30, 2022

(30) Foreign Application Priority Data

Dec. 30, 2020 (CN) .......................... 202023281295.4

(51) Int. Cl.
 *B06B 1/04* (2006.01)
 *H02K 5/22* (2006.01)
 *H02K 33/16* (2006.01)

(52) U.S. Cl.
 CPC ............. *B06B 1/045* (2013.01); *H02K 5/225* (2013.01); *H02K 33/16* (2013.01); *H02K 2211/03* (2013.01)

(58) Field of Classification Search
 CPC ...................... B06B 1/04; B06B 1/045; H02K 33/00–33/18; H02K 2211/03
 See application file for complete search history.

(56) References Cited

FOREIGN PATENT DOCUMENTS

KR 102136767 B1 * 7/2020 ............. H02K 33/02

\* cited by examiner

*Primary Examiner* — Ramon M Barrera
(74) *Attorney, Agent, or Firm* — W&G Law Group

(57) ABSTRACT

The present disclosure provides a linear motor having a housing with an accommodation space; a vibrator accommodated in the accommodation space; and a first stator locating opposite to the vibrator and fixed to the housing. The first stator includes a first circuit board opposite to the vibrator, a first coil on a the side of the first circuit board close to the vibrator, and a first magnetic conductive sheet locating on a side of the first circuit board away from the vibrator. The linear motor further has a spring bracket supporting the vibrator in the accommodation space. The present invention is to provide a linear motor which improves the space utilization of the linear motor in a thickness direction.

10 Claims, 4 Drawing Sheets

LINEAR MOTOR

FIELD OF THE PRESENT DISCLOSURE

The present disclosure relates to motors, in particular to a linear vibration motor for providing tactile feedback.

DESCRIPTION OF RELATED ART

Portable electronic devices such as mobile phones, handheld game consoles, and navigation devices in the prior art are becoming more and more popular. These products generally use linear motor for system feedback, such as mobile phone call prompts, information prompts, navigation prompts, and vibration feedback of game consoles.

A conventional linear motor usually includes a housing with an accommodation space, and a stator, a vibrator, and a V-shaped spring accommodated in the housing. The stator includes a coil, an iron core, a magnetic conductive sheet and FPC (Flexible Printed Circuit), the vibrator includes a magnet and a weight, and the vibrator and stator are connected by a V-shaped spring. The magnet is arranged in the middle of the upper and lower stator.

For conventional linear motors, if the coil is fixed to a metal part, it will involve insulation problems with the shell. In order to improve the performance of the motor, it is generally necessary to set the magnetic conductive sheet below the coil. The insulation between the coil and the magnetic conductive sheet will be very risky. The existing solution is to stick the FPC between the coil and the magnetic conductive sheet to isolate the coil from the metal parts. This solution, however, occupies a larger Z direction space and reduces the space utilization of the motor.

SUMMARY OF THE PRESENT INVENTION

One of the objects of the present invention is to provide a linear motor which improves the space utilization of the linear motor in a thickness direction.

To achieve the above-mentioned objects, the present invention provides a linear motor having a housing with an accommodation space; a vibrator accommodated in the accommodation space; and a first stator locating opposite to the vibrator and fixed to the housing. The first stator comprises a first circuit board opposite to the vibrator, a first coil on a the side of the first circuit board close to the vibrator, and a first magnetic conductive sheet locating on a side of the first circuit board away from the vibrator. The linear motor further comprises a spring bracket supporting the vibrator in the accommodation space.

The first circuit board includes a main board part opposite to the first magnetic conductive sheet, and a reinforcement part connected to one end of the main board part. A thickness of the main board part is smaller than a thickness of the reinforcement part.

The main board part and the reinforcement part are both attached to the first coil. A wall surface of the main board part on a side close to the first magnetic conductive sheet is attached to the first magnetic conductive sheet.

In addition, a thickness of an assembly of the first magnetic conductive sheet and the main board part is equal to a thickness of the reinforcement part.

In addition, a partially sunken part of the reinforcement part of the first circuit board on a side close to the first coil forms a first avoidance slot for avoiding a lead of the first coil; a projection of the first coil onto the first circuit board falls into the first circuit board.

In addition, the wall surface of the reinforcement part of the first circuit board on the side away from the vibrator and the wall surface of the first magnetic conductive sheet on the side away from the vibrator are both attached with the inner wall surface of the housing.

In addition, the linear motor further includes a second stator; wherein the second stator, the vibrator, and the first stator are directly opposite to each other in sequence.

In addition, the second stator includes a second magnetic conductive sheet, a second circuit board between the second magnetic conductive sheet and the vibrator, a second coil between the second circuit board and the vibrator; the second circuit board is electrically connected to the first circuit board.

In addition, the second circuit board includes a main body directly opposite to the second magnetic conductive sheet, and a reinforcement sheet connected to one end of the main body. A thickness of the main body is smaller than a thickness of the reinforcement sheet. A wall surface of the main body on the side close to the second magnetic conductive sheet is attached to the second magnetic conductive sheet. The main body and the wall surface of the reinforcement sheet on the side close to the second coil are both attached to the second coil.

In addition, a partially sunken part of the reinforcement sheet of the second circuit board on a side close to the second coil forms a second avoidance slot for avoiding a lead of the second coil; a projection of the second coil onto the second circuit board falls into the second circuit board.

In addition, a thickness of an assembly of the second magnetic conductive sheet and the main body is equal to a thickness of the reinforcement sheet.

In addition, a wall surface of the reinforcement sheet on a side away from the vibrator and a wall surface of the second magnetic conductive sheet away from the vibrator are both attached to an inner wall surface of the housing.

BRIEF DESCRIPTION OF THE DRAWINGS

Many aspects of the exemplary embodiments can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENTS

The present disclosure will hereinafter be described in detail with reference to exemplary embodiments. To make the technical problems to be solved, technical solutions and beneficial effects of the present disclosure more apparent, the present disclosure is described in further detail together with the figures and the embodiments. It should be understood the specific embodiments described hereby is only to explain the disclosure, not intended to limit the disclosure.

Figure 1:
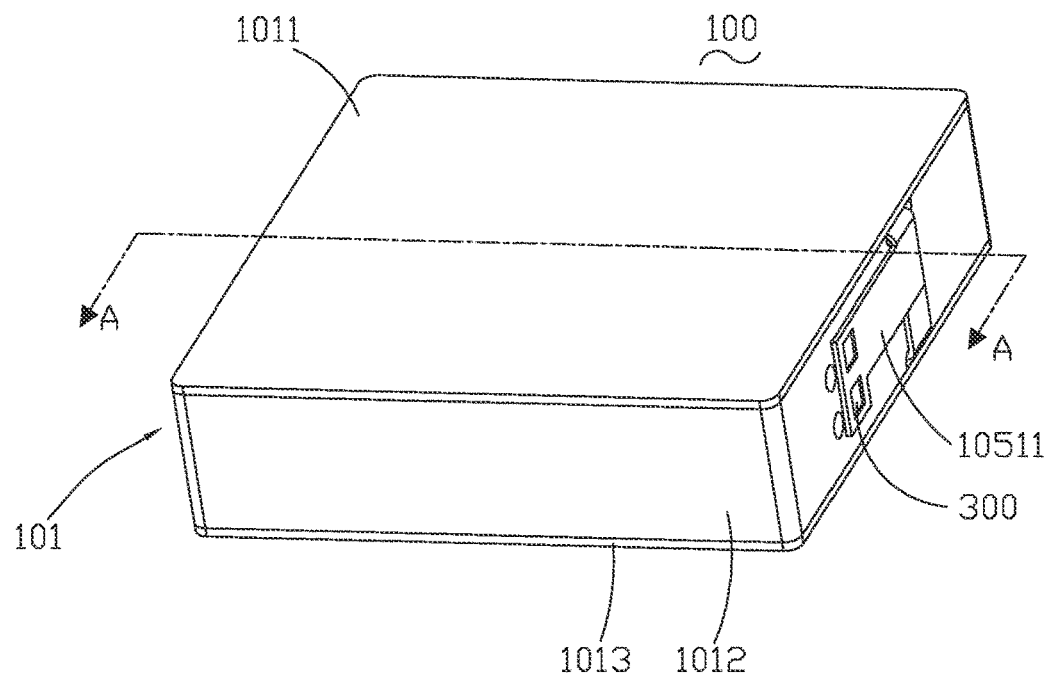
FIG. 1 is an isometric view of a linear motor in accordance with an exemplary embodiment of the present invention.
Figure 2:
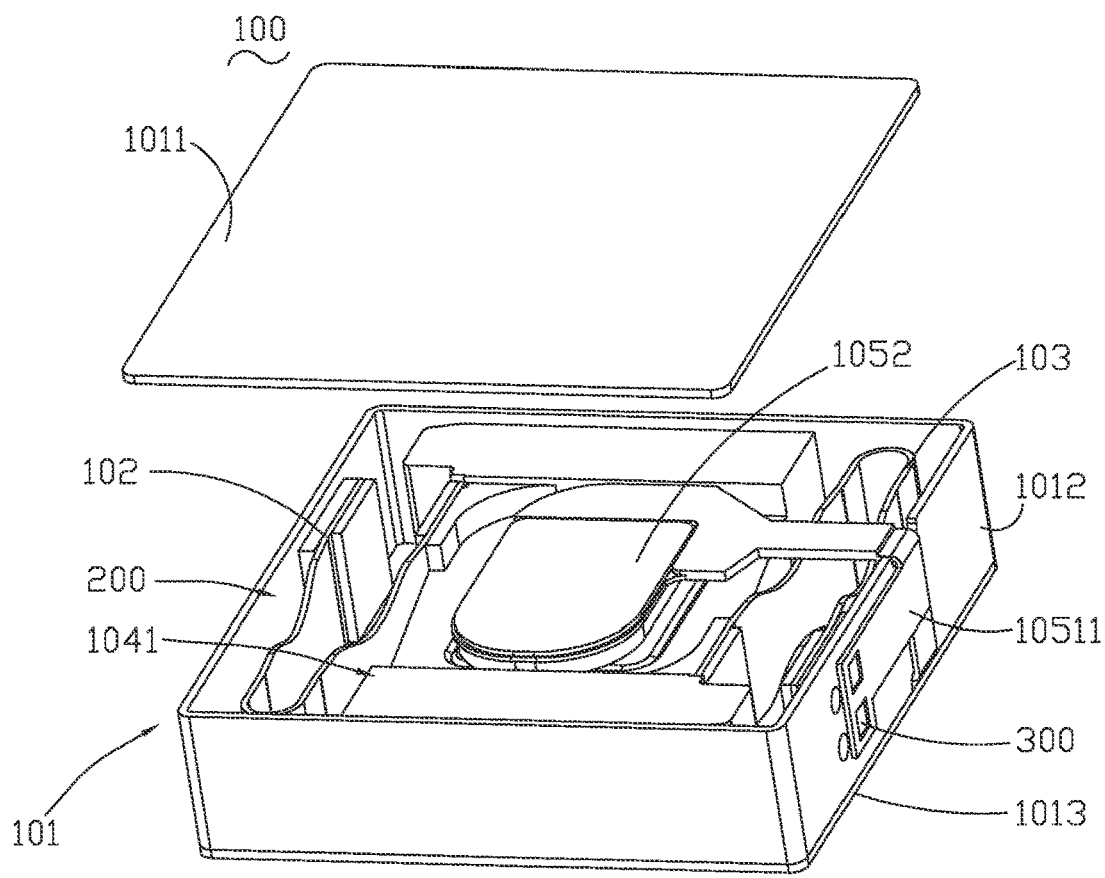
FIG. 2 is similar to FIG. 1, but an upper cover of the linear motor is disassembled thereof.
Figure 3:
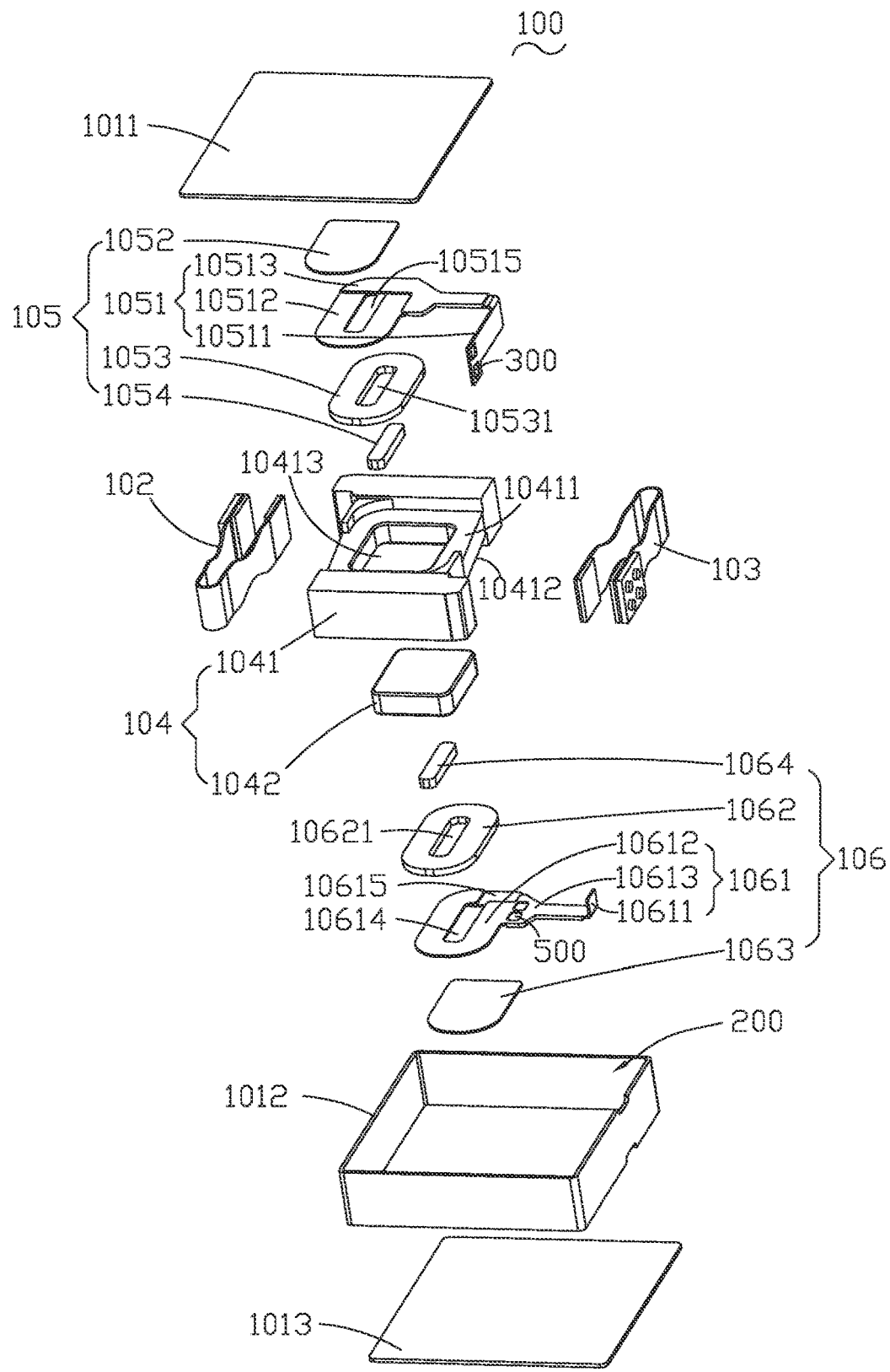
FIG. 3 is an exploded view of the linear motor in FIG. 1.

As shown in FIGS. 1-3, the linear motor 100 includes a housing 101 provided with an accommodation space 200, A first spring bracket 102, a second spring bracket 103, a vibrator 104, a first stator 105 and a second stator 106. The first spring bracket 102, the second spring bracket 103 and the vibrator 104 are all set in the housing 101. The vibrator 104 is located between the first spring bracket 102 and the second spring bracket 103. One end of the first spring bracket 102 is fixedly connected to the housing 101, and the other end is fixedly connected to the vibrator 104. One end of the second spring bracket 103 is fixedly connected to the housing 101, and the other end is fixedly connected to the vibrator 104. That is, the vibrator 104 is elastically suspended in the housing 101 through the first spring bracket 102 and the second spring bracket 103.

Figure 4:
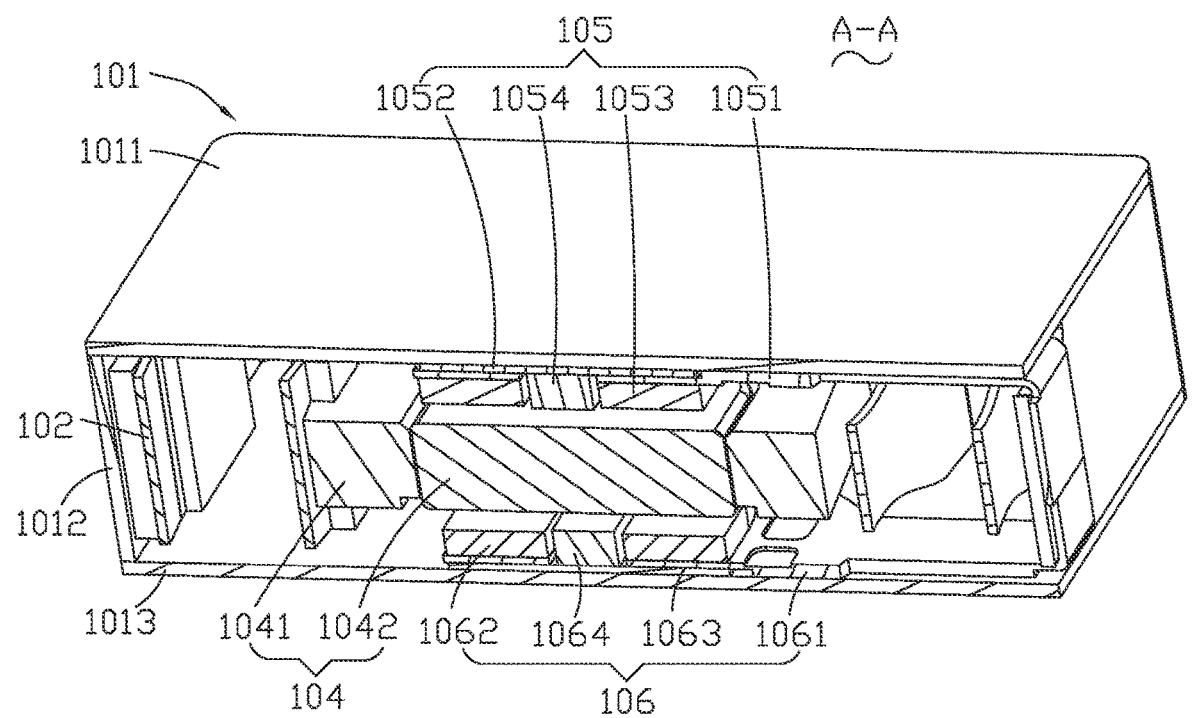
FIG. 4 is a cross-sectional view of the linear motor taken along line AA in FIG. 1.

As shown in FIGS. 2-4, specifically, the housing 101 includes an upper cover plate 1011, a sidewall 1012, and a lower cover plate 1013. The upper cover plate 1011, the sidewall 1012, and the lower cover plate 1013 are enclosed to form the accommodation space 200. The first spring bracket 102, the second spring bracket 103 and the vibrator 104 are all set in the accommodation space 200.

The first stator 105 is connected to the upper cover plate 1011. The first stator 105 includes a first circuit board 1051, and the first circuit board 1051 includes a first connection part 10511 that passes through the housing 101. The first connection part 10511 is used for electrical connection with the outside. In the specific embodiment, the first circuit board 1051 is a flexible printed circuit (Flexible Printed Circuit, FPC) made of polyimide or polyester film with high reliability and excellent flexibility. plate. It has the characteristics of high wiring density, light weight, thin thickness and good bendability. The second stator 106 is connected to the lower cover plate 1013. The second stator 106 includes a second circuit board 1061. The second circuit board 1061 includes a second connection part 10611 passing through of the housing 101. The second connection part 10611 is used for electrical connection with the outside. For specific embodiment, the second circuit board 1061 is a flexible circuit board (Flexible Printed Circuit, FPC for short). It is a highly reliable and excellent flexible printed circuit board made of polyimide or polyester film as the base material. It has the characteristics of high wiring density, light weight, thin thickness and good bendability.

Figure 5:
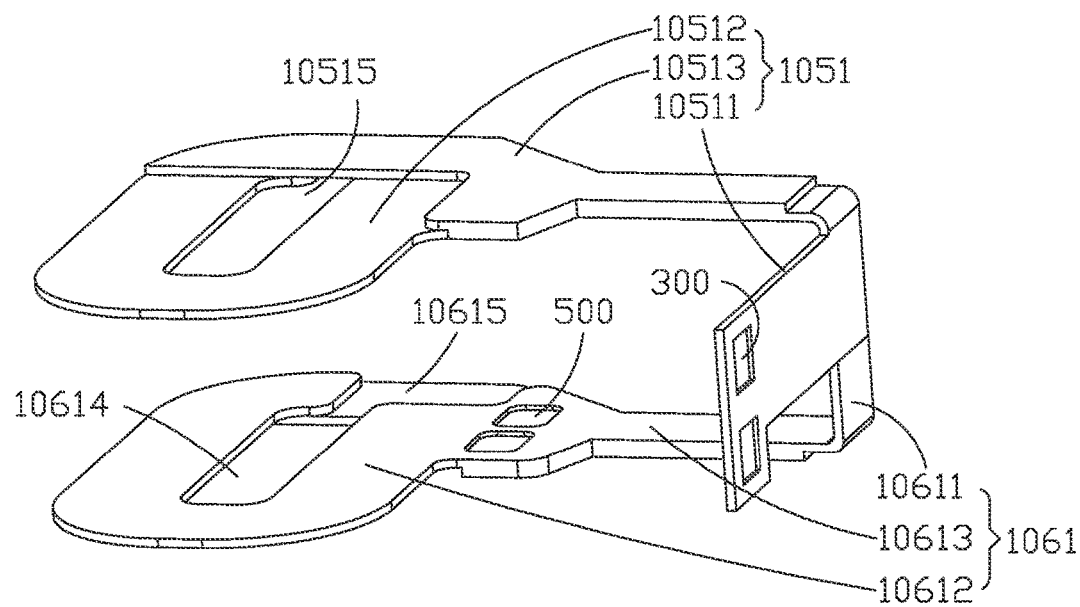
FIG. 5 is an isometric view of a first circuit board and a second circuit board of the linear motor.
Figure 6:
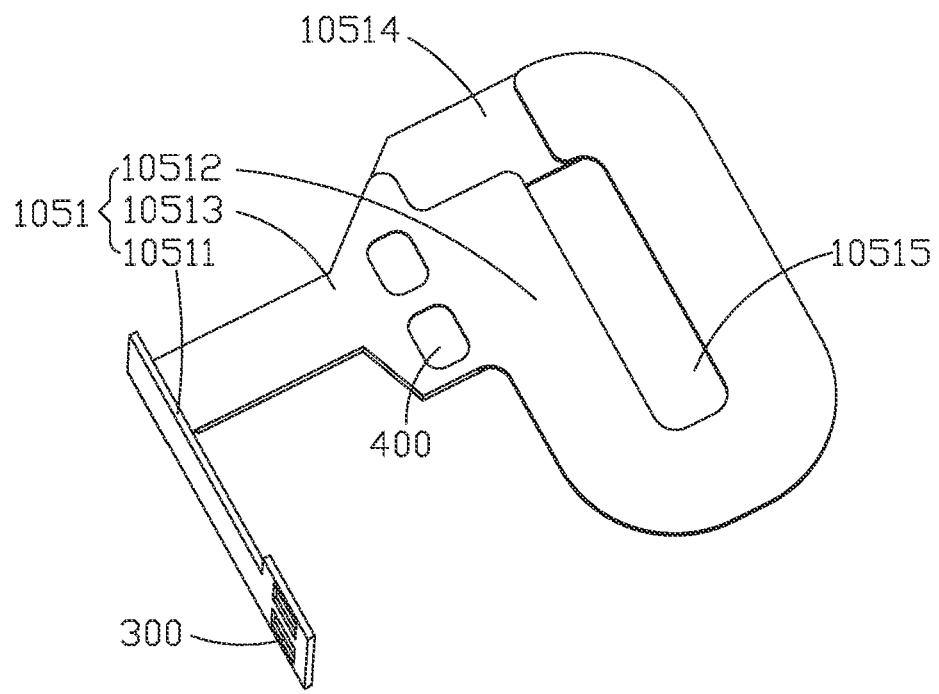
FIG. 6 is an isometric view of the first circuit board in FIG. 5.

As shown in FIGS. 3 and 5, the first connection part 10511 and the second connection part 10611 pass through the housing 101 from the same side of the housing 101. The first connection part 10511 and the first circuit board 1051 are arranged vertically. And the first circuit board 1051 is attached to the outer wall of the housing 101. The second connection part 10611 and the second circuit board 1061 are arranged vertically. And the second circuit board 1061 fits the housing 101 setting, and it is electrically connected with the first connection part 10511. In this way, when external AC power is connected, only the first connection part 10511 or the second connection part 10611 needs to be connected.

In the specific embodiment, the first connection part 10511 is provided with a contact point 300 for electrical connection with external alternating current. The contact point 300 may specifically be a groove, but is not limited to this. For example, the contact point 300 may also be a protrusion.

When the first stator 105 and the second stator 106 are energized, a magnetic field force is generated. Since the first stator 105 and the second stator 106 are fixed, the vibrator 104 is suspended between the first spring bracket 102 and the second spring bracket 103. Therefore, the vibrator 104 will move under the reaction of the magnetic field force. When the direction of the current changes constantly, the vibrator 104 will reciprocate in one direction, so that the linear motor 100 achieves the effect of vibration.

The vibrator 104 includes a weight 1041 and a magnet 1042. The magnet 1042 is embedded and fixed in the weight 1041. Specifically, weight 1041 is a hollow structure. The magnet 1042 is embedded and fixed in the weight 1041. The magnet 1042 may be an integral structure to magnetize the first stator 105 and the second stator 106, but it is not limited to this. For example, the magnet 1042 can be composed of multiple magnets 1042. A plurality of magnets 1042 respectively magnetize the first stator 105 and the second stator 106.

As shown in FIG. 3, both the first spring bracket 102 and the second spring bracket 103 are V-shaped, but not limited to this. For example, in other embodiments, the first spring bracket 102 and the second spring bracket 103 can also be U-shaped.

As shown in FIGS. 3-4, the first stator 105 and the second stator 106 are centered on the vibrator 104. The vibrator 104 is spaced between the first stator 105 and the second stator 106. And the first stator 105 and the second stator 106 are arranged oppositely.

Specifically, as shown in FIGS. 3-4, the first stator 105 further includes a first magnetic conductive sheet 1052 provided on the side of the first circuit board 1051 away from the vibrator 104. The first circuit board 1051 also includes a main board part 10512 which is arranged directly opposite to the first magnetic conductive sheet 1052 and a reinforcement part 10513 which is connected to one end of the main board part 10512. The thickness of the main board part 10512 is smaller than the thickness of the reinforcement part 10513. The wall surface of the main board part 10512 on the side close to the first magnetic conductive sheet 1052 is attached to the first magnetic conductive sheet 1052. The end of the reinforcement part 10513 away from the main board part 10512 is connected to the first connection part 10511. When the main board part 10512 is bonded to the first magnetic conductive sheet 1052, the thickness of the first magnetic conductive sheet 1052 and the main board part 10512 after bonding is equal to the thickness of the reinforcement part 10513. Advantageously, the thickness of the first magnetic conductive sheet 1052 and the first circuit board 1051 after assembly is reduced, and the size of the linear motor 100 in the Z-axis direction is reduced, thereby reducing the volume of the linear motor 100.

In addition, the wall surface of the reinforcement part 10513 of the first circuit board 1051 on the side away from the vibrator 104 and the wall surface of the first magnetic conductive sheet 1052 on the side away from the vibrator 104 are both attached to the inner wall surface of the housing 101. That is, both the first circuit board 1051 and the first magnetic conductive sheet 1052 can be firmly connected to the housing 101. Therefore, this structure reduces the size of the linear motor in the Z-axis direction while also enhancing the structural stability of the first stator 105.

As shown in FIGS. 3-6, the first stator 105 further includes a first coil 1053 arranged opposite to the vibrator 104. Both the main board part 10512 and the reinforcement part 10513 are attached to the first coil 1053. Partial sunken part of the reinforcement part 10513 of the first circuit board 1051 on the side close to the first coil 1053 forms a first avoidance slot 10514 for avoiding the leads of the first coil 1053. And the projection part of the first coil 1053 projected to the first circuit board 1051 falls on the first avoidance slot 10514. The first avoidance slot 10514 is used for the first coil 1053 wiring. The wiring that is electrically connected to the first coil 1053 can be led out from the first avoidance slot 10514. As a result, the wiring of the first coil 1053 no longer occupies the space in the thickness direction of the first coil 1053. This further reduces the size of the linear motor 100 in the Z-axis direction, thereby reducing the volume of the linear motor 100.

In specific implementation, as shown in FIGS. 3-4, the first magnetic conductive sheet 1052 is opposite to the first coil 1053. The first stator 105 also includes a first pole plate 1054. The first pole plate 1054 is located between the magnet 1042 and the first circuit board 1051. And the first pole plate 1054 passes through the first coil 1053 and the first circuit board 1051 in turn to connect with the first magnetic conductive sheet 1052. The first pole plate 1054 can improve the structural stability of the first coil 1053 and the first circuit board 1051 and the reliability of the connection between the first coil 1053 and the related parts, which is convenient for production and assembly. Moreover, the first pole plate 1054 can better conduct the surrounding magnetic lines to the first coil 1053. Thereby, the permeability of the overall magnetic circuit can be increased, and the magnetic induction intensity of the first coil 1053 can be improved. The magnetic field generated by the magnet 1042 can better act on first coil 1053. Therefore, the interaction force between the magnet 1042 and the first coil 1053, that is, the vibration force of the linear motor 100, is improved.

Specifically, as shown in FIG. 3, a first through hole 10515 is provided on the main board part 10512. A first penetrating hole 10531 is provided on the first coil 1053. The first pole plate 1054 is provided with a first coil 1053 and a first circuit board 1051 through the first penetrating hole 10531 and the first through hole 10515, Specifically, as shown in FIG. 3, the projection of the first coil 1053 onto the first circuit board 1051 falls into the first circuit board 1051. The cross-sectional area of the first coil 1053 is smaller than or equal to the lateral area of the first circuit board 1051. So that the first circuit board 1051 effectively isolates the first coil 1053 and the first magnetic conductive sheet 1052.

As shown in FIG. 3, the first stator 105, the vibrator 104, and the second stator 106 are arranged directly opposite each other in this order. With the vibrator 104 as the center, the first stator 105 and the second stator 106 are each provided on one side of the vibrator 104. It makes the vibration of linear motor 100 richer.

Figure 7:
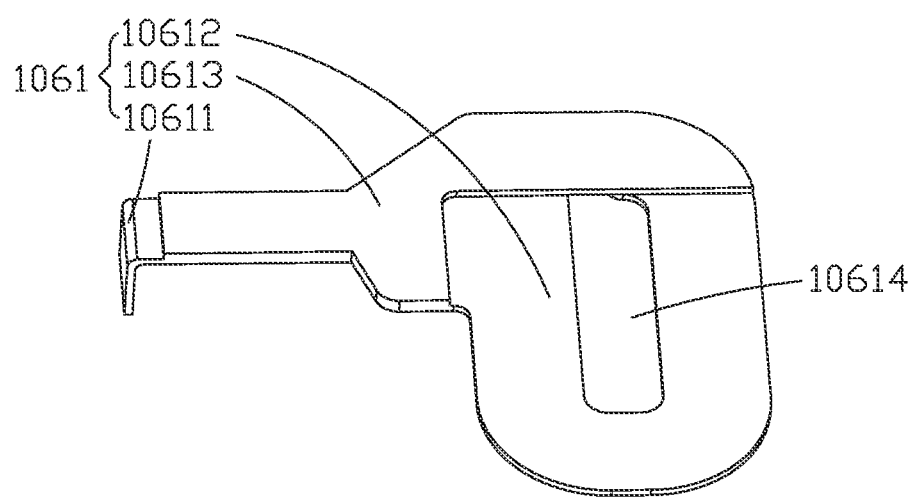
FIG. 7 is an isometric view of the second circuit board in FIG. 5.

As shown in FIG. 3, FIG. 4 and FIG. 7, the second stator 106 sequentially includes a second coil 1062, a second circuit board 1061, and a second magnetic conductive sheet 1063 that are facing the vibrator 104. The second coil 1062 is arranged relative to the magnet 1042. The second circuit board 1061 also includes a main body 10612 arranged directly opposite to the second magnetic conductive sheet 1063. And the reinforcement sheet 10613 connected to one end of the main body 10612. The thickness of the main body 10612 is smaller than the thickness of the reinforcement sheet 10613. The wall surface of the main body 10612 on the side close to the second magnetic conductive sheet 1063 is attached to the second magnetic conductive sheet 1063. The end of the reinforcement sheet 10613 away from the main body 10612 is connected to the second connection part 10611. The main body 10612 and the wall surface of the reinforcement sheet 10613 on the side close to the second coil 1062 are both attached to the second coil 1062. After the main body 10612 is bonded to the second magnetic conductive sheet 1063, the thickness of the second magnetic conductive sheet 1063 and the main body 10612 after being bonded is equal to the thickness of the reinforcement sheet 10613. The thickness of the second magnetic conductive sheet 1063 and the second circuit board 1061 after assembly is advantageously reduced. The size of the linear motor 100 in the Z-axis direction is reduced, thereby reducing the volume of the linear motor 100.

In addition, the wall surface of the reinforcement sheet 10613 on the side away from the vibrator 104 and the wall surface of the second magnetic conductive sheet 1063 on the side away from the vibrator 104 are both attached to the inner wall surface of the housing 101. That is, both the second circuit board 1061 and the second magnetic conductive sheet 1063 can be firmly connected to the housing 101. Therefore, this structure reduces the size of the linear motor in the Z-axis direction while also enhancing the structural stability of the second stator 106.

Specifically, as shown in FIGS. 3 and 7, the main body 10612 is provided with a second through hole 10614, and the second coil 1062 is provided with a second penetrating hole 10621. The second pole plate 1064 passes through the second penetrating hole 10621 and the second through hole 10614, and penetrates into the second coil 1062 and the second circuit board 1061.

As shown in FIG. 3 and FIG. 5, partial sunken part of the reinforcement sheet 10613 of the second circuit board 1061 on the side close to the second coil 1062 forms a second avoidance slot 10615 for avoiding the leads of the second coil 1062. And part of the projection of the second coil 1062 onto the second circuit board 1061 falls on the second avoidance slot 10615. The second avoidance slot 10615 is used for wiring the second coil 1062. The wiring that is electrically connected to the second coil 1062 can be drawn from the second avoidance slot 10615. As a result, the wiring of the second coil 1062 no longer occupies the space in the thickness direction of the second coil 1062. Further reduce the size of the linear motor 100 in the Z-axis direction, thereby reducing the volume of the linear motor 100.

Specifically, the first circuit board 1051 and the second circuit board 1061 may also be integrally formed parts.

As shown in FIG. 3, the second stator 106 also includes a second pole plate 1064. The second pole plate 1064 passes through the second coil 1062 and the second circuit board 1061 in turn to connect with the second magnetic conductive sheet 1063. The second pole plate 1064 is located between the magnet 1042 and the second circuit board 1061. The second pole plate 1064 can improve the structural stability of the second coil 1062 and the second circuit board 1061 and the reliability of the connection between the second coil 1062 and related parts, and at the same time, it is convenient for production and assembly. Moreover, the second pole plate 1064 can better conduct the surrounding magnetic lines to the second coil 1062. Thereby, the permeability of the overall magnetic circuit can be increased, and the magnetic induction intensity of the second coil 1062 can be improved. The magnetic field generated by magnet 1042 can better act on the second coil 1062. Therefore, the interaction force between the magnet 1042 and the second coil 1062, that is, the vibration force of the linear motor 100, is improved.

Specifically, the projection of the second coil 1062 onto the second circuit board 1061 falls into the second circuit board 1061. In this way, the area of the second coil 1062 is smaller than or equal to the lateral area of the second circuit board 1061. In this way, the first circuit board 1051 effectively isolates the second coil 1062 and the second magnetic conductive sheet 1063.

Specifically, the first magnetic conductive sheet 1052 and the second magnetic conductive sheet 1063 can be made of SPCD material. It can concentrate magnetism and protect the first coil 1052 and the second coil 1062. The first pole plate 1054 and the second pole plate 1064 can be iron cores, but are not limited to this. For example, the material of the first pole plate 1054 and the second pole plate 1064 may also be steel products.

As shown in FIGS. 3 to 6, a first soldering plate 400 is provided on one side of the first circuit board 1051 where the first avoidance slot 10514 is opened. The first soldering plate 400 is located on one side of the first avoidance slot 10514. The first soldering plate 400 has a square shape, but it is not limited to this. For example, in other embodiments, the first soldering plate 400 may also be round. Wherein, the number of the first soldering plate 400 is two. The first soldering plate 400 is used for electrical connection with the wire drawn from the lead interface of the first coil 1053, so as to achieve the purpose of electrical connection with the first coil 1053.

As shown in FIG. 3 and FIG. 5, a second soldering plate 500 is provided on the side of the second circuit board 1061 where the second avoidance slot 10615 is arranged. The second soldering plate 500 is located on the side of the second avoidance slot 10615. The second soldering plate 500 is in square shape, but it is not limited to this. For example, in other embodiments, the second soldering plate 500 can also be round. Wherein, the number of the second soldering plate 500 is two. The second soldering plate 500 is used for electrical connection with the wire drawn from the lead interface of the second coil 1062, so as to achieve the purpose of electrical connection with the second coil 1062.

Specifically, the first circuit board 1051 and the first magnetic conductive sheet 1052 are attached to the inner wall surface of the upper cover plate 1011 after being assembled. The second circuit board 1061 and the second magnetic conductive sheet 1063 are assembled to the inner wall surface of the lower cover plate 1013.

As shown in FIG. 3, the side of the weight 1041 facing the first coil 1053 is recessed to form a first active slot 10411 for accommodating the first coil 1053. The bottom of the first active slot 10411 is provided with a mounting slot 10413 for embedding the magnet 1042. The side of the weight 1041 facing the second coil 1062 is recessed to form a second active slot 10412 for accommodating the second coil 1062. The first active slot 10411 and the second active slot 10412 are set symmetrically. The first coil 1053 is accommodated in the first active slot 10411. The second coil 1062 is accommodated in the second active slot 10412. During the movement of the weight 1041, the first coil 1053 can move relative to the weight 1041 in the first active slot 10411. The second coil 1062 can move relative to the weight 1041 in the second active slot 10412. Therefore, the collision between the first coil 1053 and the second coil 1062 and the weight 1041 can be avoided, and the reliability of the linear motor 100 is ensured.

As shown in FIGS. 1 to 7, in the linear motor 100 of the present invention, the first circuit board 1051 is provided with a main board part 10512 for the first magnetic conductive sheet 1052 to be assembled. The thickness of the main board part 10512 is smaller than the thickness of the reinforcement part 10513 of the first circuit board 1051. And a first avoidance slot 10514 is provided on the side of the reinforcement part 10513 close to the first coil 1053 to avoid the lead of the first coil 1053. The second circuit board 1061 is provided with a main body 10612 for the second magnetic conductive sheet 1063 to be assembled. The thickness of the main body 10612 is smaller than the thickness of the reinforcement sheet 10613 of the second circuit board 1061. And set the second avoidance slot 10615 on the side of the reinforcement sheet 10613 close to the second coil 1062 to avoid the leads of the second coil 1062. The first circuit board 1051 and the second circuit board 1061 are made into structures with uneven thickness. And the avoidance slot used to assemble the magnetic conductive sheet and the lead wire of the coil is misplaced. In order to achieve on the basis of not occupying the space of the linear motor 100 in the Z-axis direction. At the same time, the insulation function and wiring function of the coil and the magnetic conductive sheet are realized, which greatly improves the space utilization of the linear motor 100.

The thickness of the first magnetic conductive sheet 1052 and the main board part 10512 of the first circuit board 1051 after being bonded is equal to the thickness of the reinforcement part 10513. To facilitate the assembly of the main board part 10512 and upper cover plate 1011. And the thickness of the second magnetic conductive sheet 1063 and the main body 10612 of the second circuit board 1061 after being bonded is equal to the thickness of the reinforcement sheet 10613. In order to facilitate the assembly of the main body 10612 and the lower cover plate 1013, the space utilization of the linear motor 100 in the thickness direction is further improved.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A linear motor including:
a housing with an accommodation space;
a vibrator accommodated in the accommodation space;
a first stator locating opposite to the vibrator and fixed to the housing, comprising a first circuit board opposite to the vibrator, a first coil on a side of the first circuit board close to the vibrator, and a first magnetic conductive sheet locating on a side of the first circuit board away from the vibrator;
a spring bracket supporting the vibrator in the accommodation space; wherein
the first circuit board includes a main board part opposite to the first magnetic conductive sheet, and a reinforcement part connected to one end of the main board part; a thickness of the main board part is smaller than a thickness of the reinforcement part; the main board part and the reinforcement part are both attached to the first coil; a wall surface of the main board part on a side close to the first magnetic conductive sheet is attached to the first magnetic conductive sheet.

2. The linear motor as described in claim 1, wherein, a thickness of an assembly of the first magnetic conductive sheet and the main board part is equal to a thickness of the reinforcement part.

3. The linear motor as described in claim 1, wherein, a partially sunken part of the reinforcement part of the first circuit board on a side close to the first coil forms a first avoidance slot for avoiding a lead of the first coil; a projection of the first coil onto the first circuit board falls into the first circuit board.

4. The linear motor as described in claim 1, wherein, the wall surface of the reinforcement part of the first circuit board on the side away from the vibrator and the wall surface of the first magnetic conductive sheet on the side away from the vibrator are both attached with the inner wall surface of the housing.

5. The linear motor as described in claim 1 further including a second stator; wherein the second stator, the vibrator, and the first stator are directly opposite to each other in sequence.

6. The linear motor as described in claim 5, wherein, the second stator includes a second magnetic conductive sheet, a second circuit board between the second magnetic conductive sheet and the vibrator, a second coil between the second circuit board and the vibrator; the second circuit board is electrically connected to the first circuit board.

7. The linear motor as described in claim 6, wherein, the second circuit board includes a main body directly opposite to the second magnetic conductive sheet, a reinforcement sheet connected to one end of the main body; a thickness of the main body is smaller than a thickness of the reinforcement sheet; a wall surface of the main body on the side close to the second magnetic conductive sheet is attached to the second magnetic conductive sheet; the main body and the wall surface of the reinforcement sheet on the side close to the second coil are both attached to the second coil.

8. The linear motor as described in claim 7, wherein, a partially sunken part of the reinforcement sheet of the second circuit board on a side close to the second coil forms a second avoidance slot for avoiding a lead of the second coil; a projection of the second coil onto the second circuit board falls into the second circuit board.

9. The linear motor as described in claim 7, wherein, a thickness of an assembly of the second magnetic conductive sheet and the main body is equal to a thickness of the reinforcement sheet.

10. The linear motor as described in claim 7, wherein, a wall surface of the reinforcement sheet on a side away from the vibrator and a wall surface of the second magnetic conductive sheet away from the vibrator are both attached to an inner wall surface of the housing.

* * * * *